United States Patent
Rey et al.

(10) Patent No.: US 12,020,395 B2
(45) Date of Patent: Jun. 25, 2024

(54) SYSTEMS AND METHODS FOR COMPRESSING AND DECOMPRESSING A SEQUENCE OF IMAGES

(71) Applicant: STX Financing, LLC, Burbank, CA (US)

(72) Inventors: Richard Rey, Los Angeles, CA (US); Andrew Vick, Los Angeles, CA (US); Bettina Martin, Burbank, CA (US)

(73) Assignee: STX Financing, LLC, Burbank, CA (US)

( * ) Notice: Subject to any disclaimer, the term of this patent is extended or adjusted under 35 U.S.C. 154(b) by 462 days.

(21) Appl. No.: 17/439,658

(22) PCT Filed: Mar. 15, 2019

(86) PCT No.: PCT/US2019/022629
§ 371 (c)(1),
(2) Date: Sep. 15, 2021

(87) PCT Pub. No.: WO2020/190270
PCT Pub. Date: Sep. 24, 2020

(65) Prior Publication Data
US 2022/0156880 A1    May 19, 2022

(51) Int. Cl.
*G06T 3/40* (2006.01)
*G02B 27/01* (2006.01)
(Continued)

(52) U.S. Cl.
CPC ............ *G06T 3/40* (2013.01); *G02B 27/0172* (2013.01); *G06T 7/70* (2017.01); *G06T 9/00* (2013.01); *G06T 19/006* (2013.01)

(58) Field of Classification Search
CPC .... G06T 3/40; G06T 7/70; G06T 9/00; G06T 19/006; G06T 3/0056; G06T 3/005; G06T 3/0018; G06T 3/0043; G06T 3/0048; G06T 3/0062; G06T 3/0093; G06T 3/0087; G06T 15/40; G06T 15/205; G06T 19/001; G06T 17/00; G06T 19/003; G06T 2207/10012; G06T 2207/10016; G06T 2200/04; G06T 7/246; G06T 7/85; G06T 15/10;
(Continued)

(56) References Cited

U.S. PATENT DOCUMENTS 10,957,044 B2 * 3/2021 Van Der Auwera ... H04N 19/88
2008/0031334 A1   2/2008 Qui et al.
(Continued)

FOREIGN PATENT DOCUMENTS

CN    107040783 A  *  8/2017  ........... H04N 19/159
KR    20190008901 A *  1/2019  ........... H04N 21/816

*Primary Examiner* — Jose L Couso
(74) *Attorney, Agent, or Firm* — Sheppard, Mullin, Richter & Hampton LLP

(57) ABSTRACT

Systems and methods for compressing and decompressing a sequence of images are disclosed. Exemplary implementations may: retrieve the captured visual information from electronic storage; extract a portion from the captured visual information; compress the extracted portion horizontally into a compressed video sequence; create a container that is configured to contain the compressed video sequence; and store the container in electronic storage. The compressed video sequence is decompressed for presentation to users.

20 Claims, 10 Drawing Sheets

(51) Int. Cl.
*G06T 7/70* (2017.01)
*G06T 9/00* (2006.01)
*G06T 19/00* (2011.01)

(58) Field of Classification Search
CPC ............ G06T 2200/32; G02B 27/0172; H04N 21/234345; H04N 21/2387; H04N 21/4728; H04N 21/85406; H04N 21/816; H04N 13/204; H04N 13/243; H04N 7/147; H04N 19/167; H04N 19/597; H04N 19/698; H04N 19/00; H04N 19/46; H04N 19/70; H04N 23/698; G03B 37/00; G03B 37/04; G03B 7/00; G03B 7/08; G03B 7/093; H04L 65/70; G06F 3/011; G06F 16/71; G06V 20/40; G06V 20/64; G06V 30/1437; G06V 30/147
See application file for complete search history.

(56) References Cited

U.S. PATENT DOCUMENTS

| | | | |
|---|---|---|---|
| 2010/0115051 A1* | 5/2010 | Robert | G06F 16/90335 709/217 |
| 2010/0300006 A1 | 12/2010 | Magpuri | |
| 2014/0176542 A1* | 6/2014 | Shohara | G06T 17/00 345/420 |
| 2014/0258552 A1* | 9/2014 | Oyman | H04L 65/762 709/231 |
| 2015/0256746 A1 | 9/2015 | MacMillan et al. | |
| 2016/0269632 A1* | 9/2016 | Morioka | H04N 5/265 |
| 2017/0103577 A1 | 4/2017 | Mendhekar et al. | |
| 2017/0295309 A1 | 10/2017 | Cabral et al. | |
| 2017/0336705 A1* | 11/2017 | Zhou | G06T 9/00 |
| 2018/0035134 A1* | 2/2018 | Pang | H04N 13/117 |
| 2018/0063590 A1* | 3/2018 | Her | H04N 21/816 |
| 2018/0084257 A1* | 3/2018 | Abbas | H04N 19/176 |
| 2018/0084283 A1* | 3/2018 | Walkingshaw | H04N 19/119 |
| 2018/0192001 A1 | 7/2018 | Boyce | |
| 2018/0276789 A1* | 9/2018 | Van Der Auwera | G06T 7/11 |
| 2018/0343472 A1* | 11/2018 | Wang | H04N 21/85406 |
| 2019/0313021 A1* | 10/2019 | Hannuksela | H04L 65/70 |
| 2019/0387237 A1* | 12/2019 | Phillips | H04N 21/8456 |
| 2020/0174262 A1* | 6/2020 | Godar | G06F 3/015 |
| 2020/0177809 A1* | 6/2020 | Hannuksela | H04N 21/23418 |

* cited by examiner

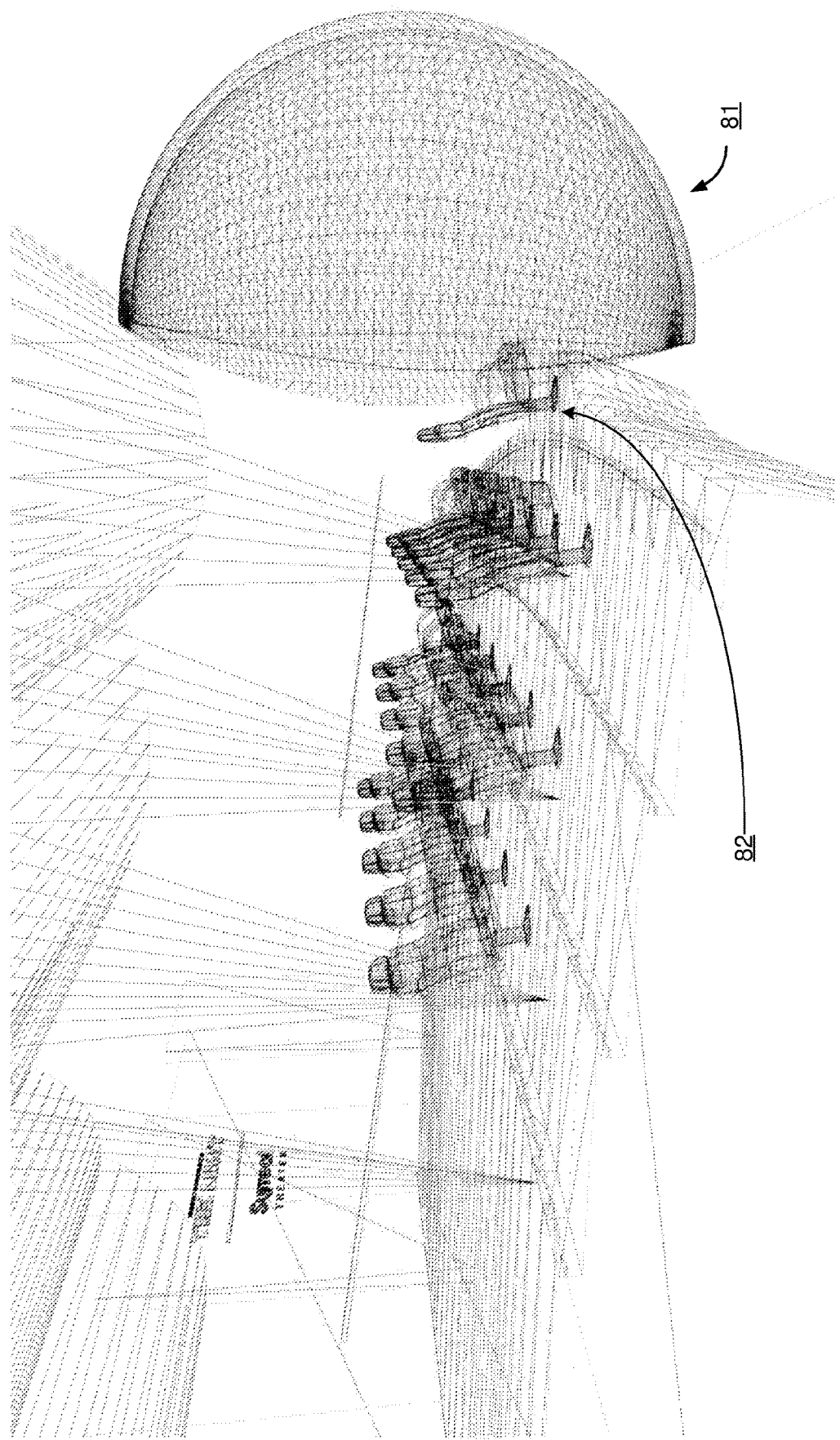

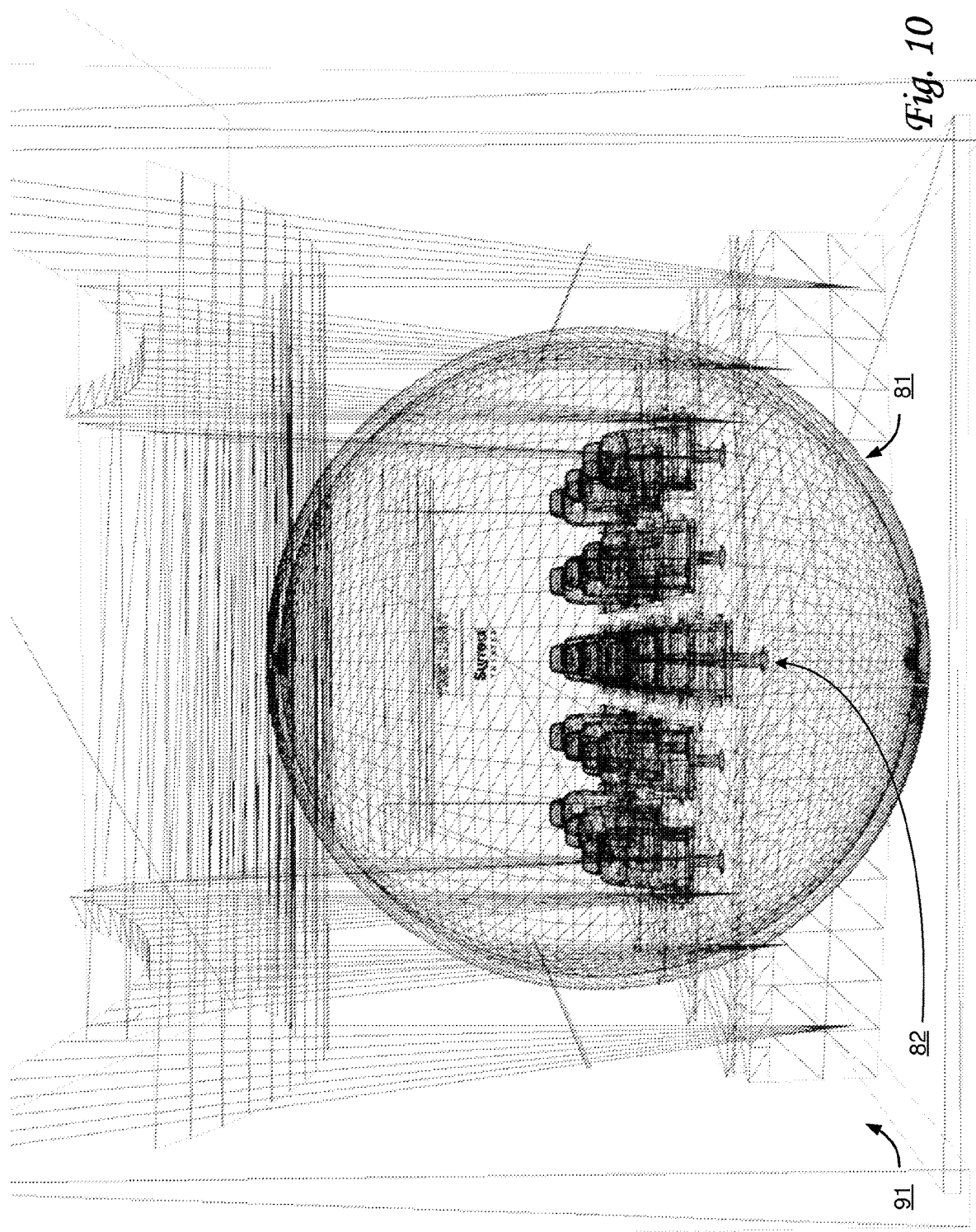

SYSTEMS AND METHODS FOR COMPRESSING AND DECOMPRESSING A SEQUENCE OF IMAGES

FIELD OF THE DISCLOSURE

The present disclosure relates to systems and methods for compressing and decompressing a sequence of images.

BACKGROUND

Using one or more lenses to capture 360-degree images is known. Presenting such visual information to a user wearing a head-mounted device is known.

SUMMARY

One aspect of the present disclosure relates to a system. The system may include one or more hardware processors configured by machine-readable instructions. The processor(s) may be configured to retrieve the captured visual information from electronic storage. The processor(s) may be configured to extract a portion from the captured visual information. The extracted portion may have a horizontal angle-of-view of at least 200 degrees. The extracted portion may have a vertical angle-of-view of at least 180 degrees. The extracted portion may have the vertical angle-of-view of fewer degrees than the horizontal angle-of-view. The processor(s) may be configured to compress the extracted portion horizontally into a compressed video sequence. The processor(s) may be configured to create a container that is configured to contain the compressed video sequence. The processor(s) may be configured to store the container in electronic storage.

Another aspect of the present disclosure relates to a method. The method may include retrieving the captured visual information from electronic storage. The method may include extracting a portion from the captured visual information. The extracted portion may have a horizontal angle-of-view of at least 200 degrees. The extracted portion may have a vertical angle-of-view of at least 180 degrees. The extracted portion may have the vertical angle-of-view of fewer degrees than the horizontal angle-of-view. The method may include compressing the extracted portion horizontally into a compressed video sequence. The method may include creating a container that is configured to contain the compressed video sequence. The method may include storing the container in electronic storage.

As used herein, any association (or relation, or reflection, or indication, or correspondency) involving lenses, sensors, angles, extracted portions, compressed portions, containers, projections, formats, vertical lines, pixels, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 8-9-10 illustrate exemplary images representing immersive virtual theatre environments including a dome shaped for immersive projection as may be used by a system configured for capturing and transforming wide-angle video information, in accordance with one or more implementations.

DETAILED DESCRIPTION

Figure 1:
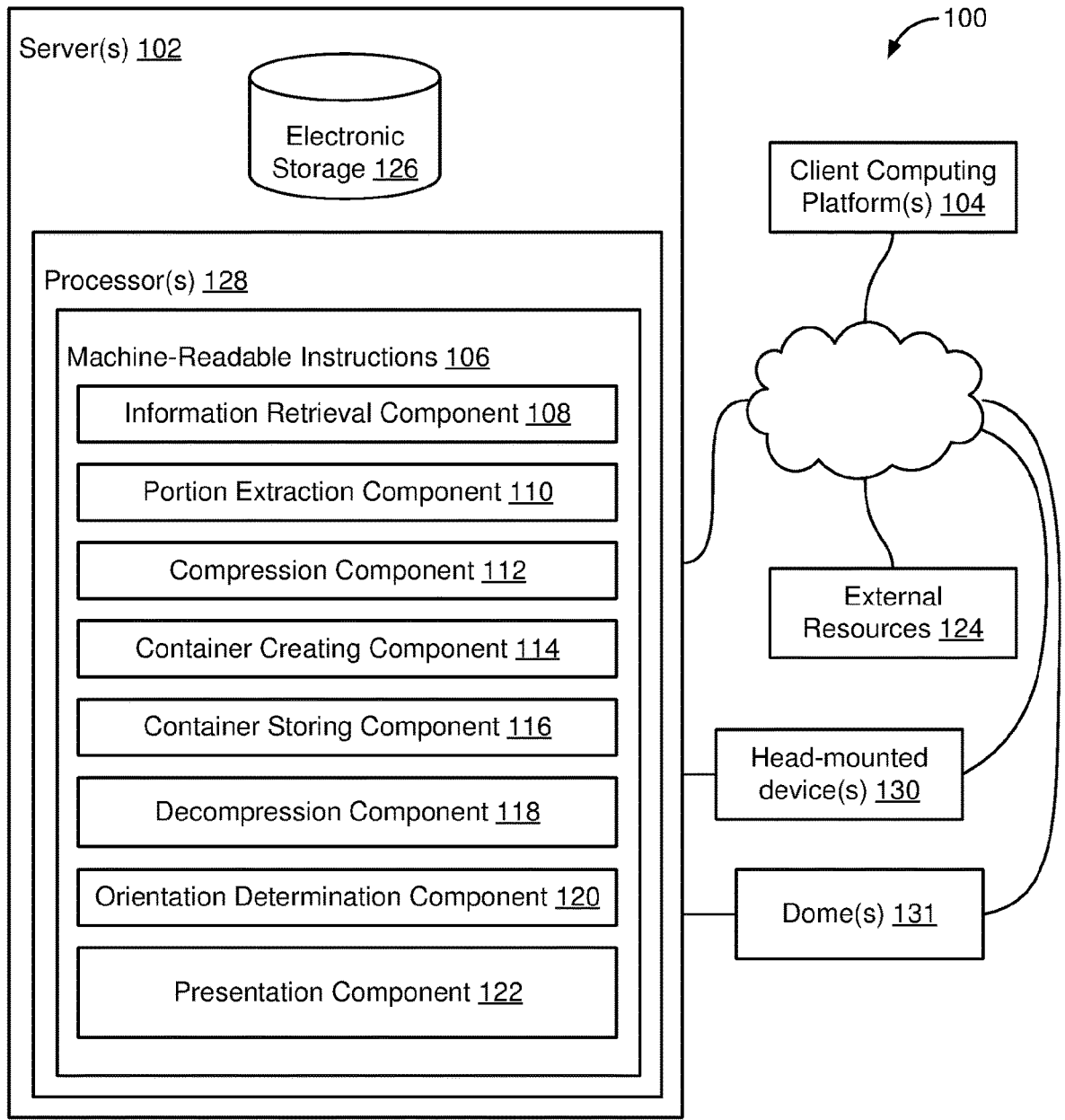
FIG. 1 shows a system configured for compressing and decompressing a sequence of images, in accordance with one or more implementations.

FIG. 1 illustrates a system 100 for compressing and decompressing a sequence of images, in accordance with one or more implementations. In some implementations, once the decompressed images (or video sequence) is presented through the virtual reality head-mounted device, viewer may enjoy an immersive user experience. In some implementations, system 100 may include one or more head-mounted devices 130, domes 131, servers 102, client computing platforms 104, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of an information retrieval component 108, a portion extraction component 110, a compression component 112, a container creating component 114, a container storing component 116, a decompression component 118, an orientation determination component 120, a presentation component 122, and/or other instruction components.

Information retrieval component 108 may be configured to retrieve information from electronic storage. In some implementations, the retrieved information may be visual information. In some implementations, the retrieved information may be captured visual information. In some implementations, the retrieved information may be based on captured visual information. In some implementations, the captured visual information may have a resolution of at least 8192×4096 pixels. In some implementations, the captured visual information may have a resolution between 3840×2160 pixels and 8192×4096 pixels. In some implementations, the captured visual information is a center extract in 6:5 aspect ratio, and the resolution is 5184×4320 pixels or greater. In some implementations, the retrieved information may be retrieved from a container, e.g., a standard container as commonly used to store 360-degree media content. For example, standard containers may contain media content in one or more specific resolutions and/or specific aspect ratios, including but not limited to a 16:9 aspect ratio. In some implementations, the container may be configured to contain 360-degree spherical video content. In some implementations, the container may be configured to contain 360-degree virtual reality content. In some implementations, the container may be configured to contain 360-degree spherical media content including both video content and virtual reality content.

Figure 3:
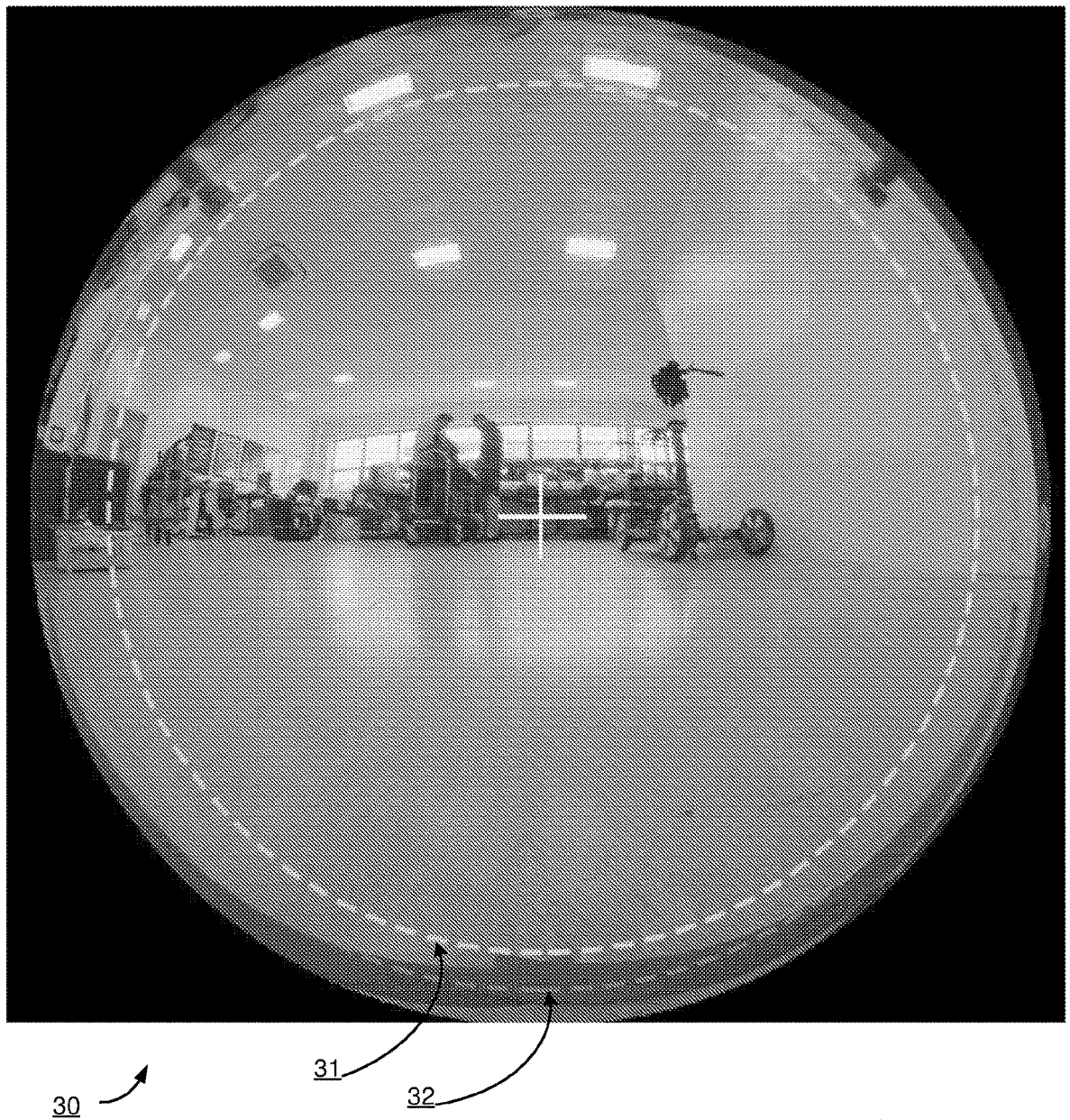
FIG. 3 illustrates an exemplary image representing captured visual information, as may be used by the system in accordance with one or more implementations.

In some implementations, the visual information retrieved by information retrieval component 108 may have been captured by one or more image sensors. The one or more image sensors may be configured to capture information, including but not limited to wide-angled information. The captured visual information may represent a video sequence. By way of non-limiting example, FIG. 3 illustrates an exemplary image 30 representing wide-angled visual information as captured using a fisheye lens. Inner dotted line 31 corresponds to an angle-of-view of about 180 degrees. Outer dotted line 32 corresponds to an angle-of-view of about 200 degrees.

Referring to FIG. 1, portion extraction component 110 may be configured to extract a portion from the retrieved information. For example, portion extraction component 110 may be configured to extract a portion of captured visual information. The extracted portion may be smaller than the entire retrieved information. For example, the extracted portion may have a horizontal angle-of-view that is fewer degrees than the horizontal angle-of-view of the retrieved information. For example, the extracted portion may have a vertical angle-of-view that is fewer degrees than the vertical angle-of-view of the retrieved information. In some implementations, the extracted portion may have a horizontal angle-of-view of at least 200 degrees. In some implementations, the extracted portion may have a vertical angle-of-view of at least 180 degrees. In some implementations, the vertical angle-of-view of the extracted portion may have fewer degrees than the horizontal angle-of-view of the extracted portion. In some implementations, the extracted portion may have a resolution of at least 4551×4096 pixels. In some implementations, the extracted portion may have a resolution for which the horizontal number of pixels is between 5% and 25% greater than the vertical number of pixels.

Compression component 112 may be configured to compress and/or process information. Compression component 112 may be configured to compress an extracted portion from the retrieved information horizontally into a compressed video sequence. The compressed video sequence may have a proprietary lat-long format (i.e., latitude-longitude format). In some implementations, a standard lat-long format may be used. In some implementations, the compressed video sequence may have a resolution of at least 4096×4096 pixels. In some implementations, the compressed video sequence may have a resolution for which the horizontal number of pixels matches the vertical number of pixels. Compressing the extracted portion horizontally may be performed such that a first sub-portion in the center of the captured visual information is compressed less than a second sub-portion at the periphery of the captured visual information.

In some implementations, compressing the extracted portion horizontally may include converting the extracted portion into a rectilinear projection that represents the captured visual information. In some implementations, compressing the extracted portion horizontally may include converting the rectilinear projection into a viewable video sequence that has a format suitable for presentation in a virtual reality head-mounted device. In some implementations, converting the extracted portion into the rectilinear projection may be performed such that vertical lines in captured real-world images (i.e., images without the radial distortion—or barrel distortion—common to fisheye lenses) correspond to vertical lines in the rectilinear projection. In some implementations, converting the extracted portion into the rectilinear projection may be performed such that vertical lines as viewed by humans viewing a real-world scene correspond to vertical lines in the rectilinear projection of the same captured scene. In some implementations, the conversion into the rectilinear projection may be performed such that vertical lines in the center of the captured real-world images more closely correspond to vertical lines in the rectilinear projection than vertical lines near the periphery of the captured real-world images. In some implementations, the rectilinear projection may be a perspective projection.

Figure 4:
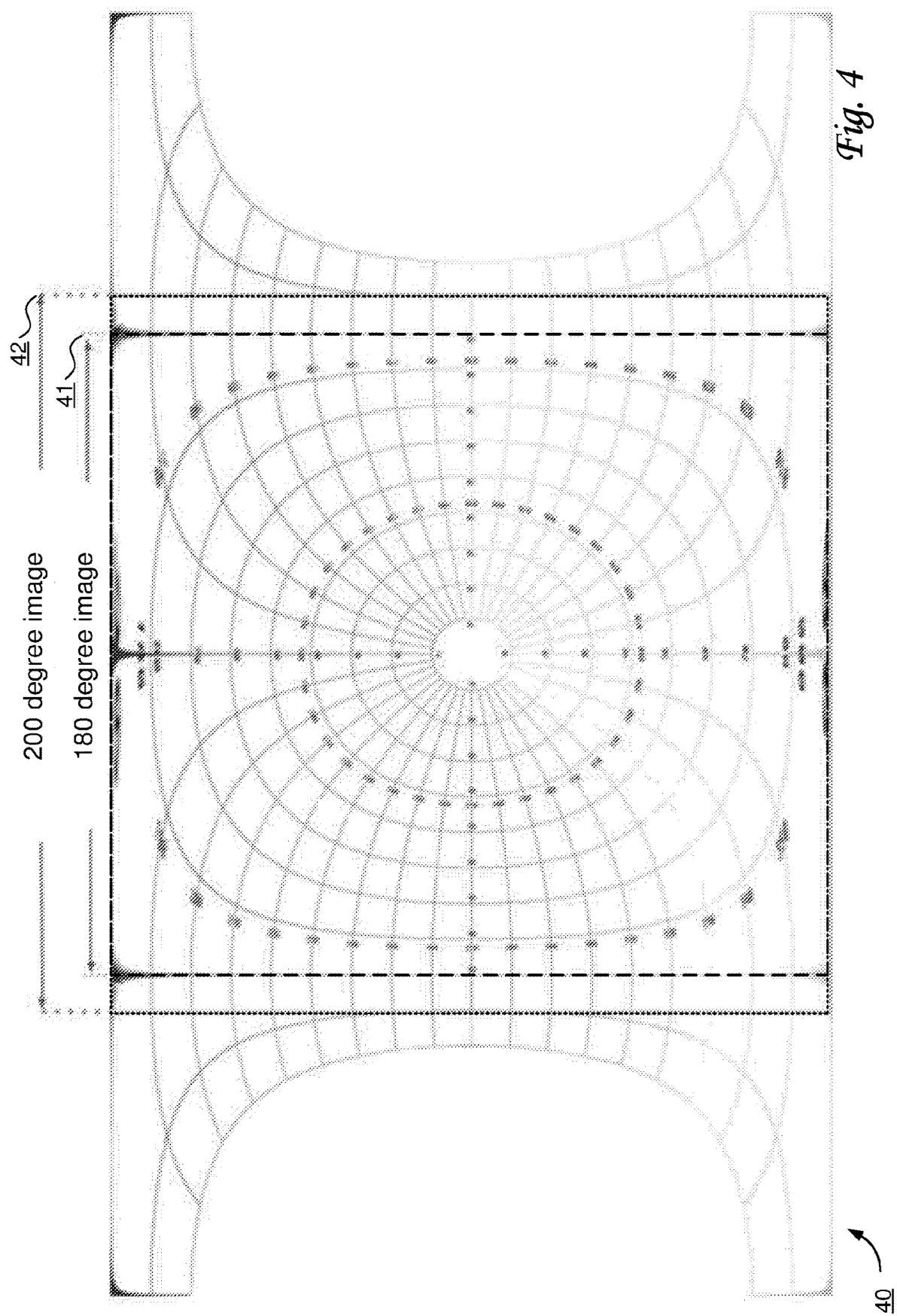
FIG. 4 illustrates an exemplary image representing a rectilinear projection, as may be used by the system in accordance with one or more implementations.

By way of non-limiting example, FIG. 4 illustrates an exemplary image 40 representing a rectilinear projection based on a conversion of captured visual information. Boundary 41 corresponds to an image having a horizontal angle-of-view of 180 degrees (this is the inner dotted rectangle). Boundary 42 corresponds to an image having a horizontal angle-of-view of 200 degrees (this is the outer dotted rectangle, using smaller dots than the inner dotted rectangle).

Figure 5:
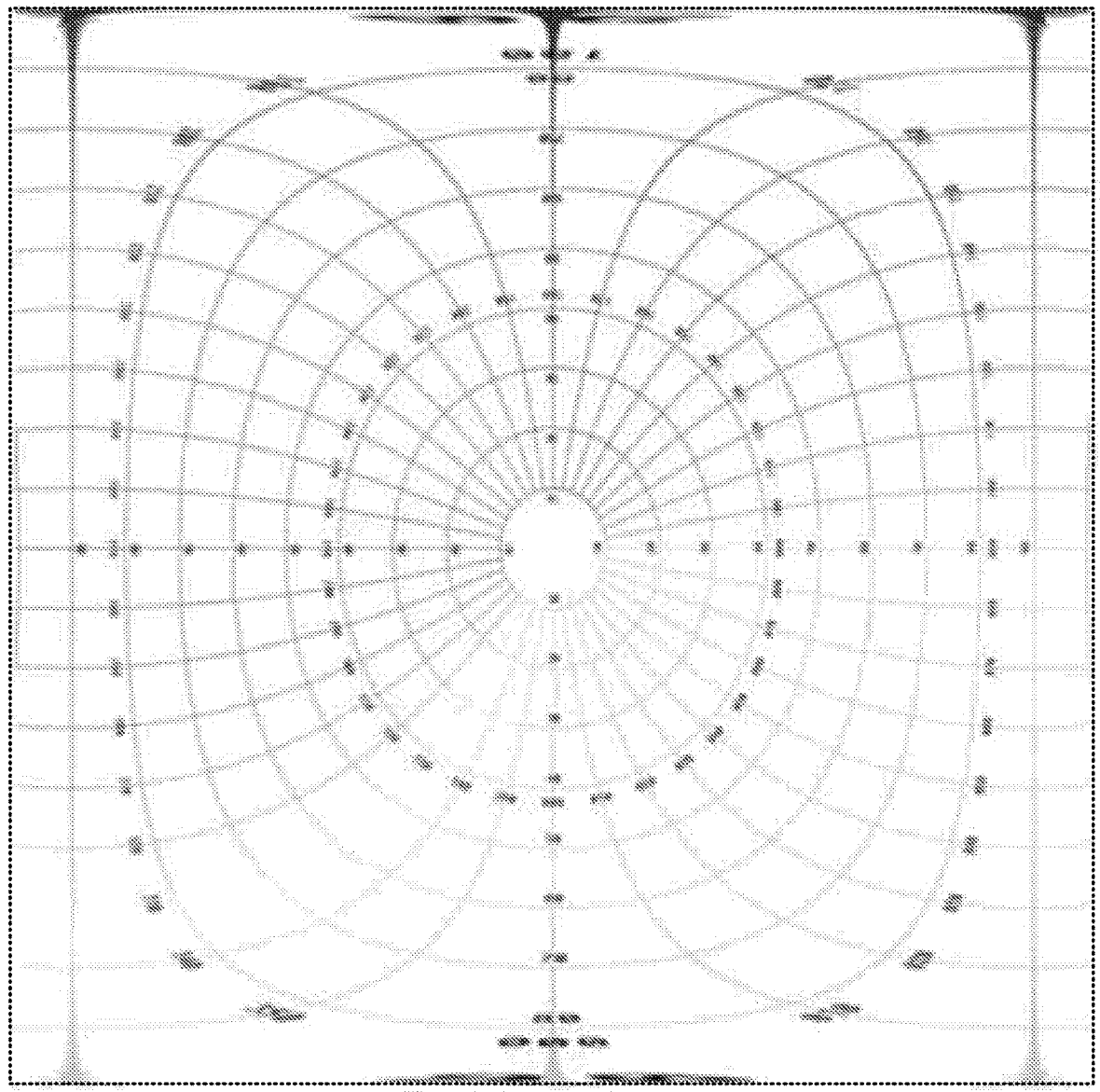
FIG. 5 illustrates an exemplary image representing horizontal compression of an image, as may be used by the system in accordance with one or more implementations.

By way of non-limiting example, FIG. 5 illustrates an exemplary image 50 representing horizontal compression, wherein image 50 (within the dotted rectangle) has a horizontal angle-of-view of 200 degrees, and a vertical angle-of-view having fewer degrees than its horizontal angle-of-view. By compressing horizontally, the resulting image has a horizontal resolution that is equal to the vertical resolution. In some implementations, the resolution of image 50 may be 4 k×4 k pixels (e.g., 4096×4096 pixels). Other resolutions are contemplated within the scope of this disclosure, including square resolutions. Image 50 may be a compressed version of the area indicated in FIG. 4 by boundary 42 (the outer dotted rectangle in FIG. 4).

Referring to FIG. 1, container creating component 114 may be configured to create a container that is configured to contain information, e.g., the compressed video sequence. The compressed video sequence in the container may have a particular format. In some implementations, the format of the container may have a resolution of at least 8192×4096 pixels. In some implementations, the format of the container may have a resolution between 3840×2160 pixels and 8192× 4096 pixels. In some implementations, the format of the container may have a resolution of 5184×4320 pixels or greater. In some implementations, the format of the container may have a resolution for which the horizontal number of pixels matches the vertical number of pixels, e.g., 2048 pixels, 2160 pixels, 3072 pixels, 3840 pixels, 4096 pixels, and/or another number of pixels.

Container creating component 114 may be configured to create a standard container as commonly used to store 360-degree media content. For example, standard containers may contain media content in one or more specific resolutions and/or specific aspect ratios, including but not limited to a 16:9 aspect ratio. In some implementations, the created container may be configured to contain 360-degree spherical video content. In some implementations, the created container may be configured to contain 360-degree virtual reality content. In some implementations, the created container may be configured to contain 360-degree spherical media content including both video content and virtual reality content.

Figure 7:
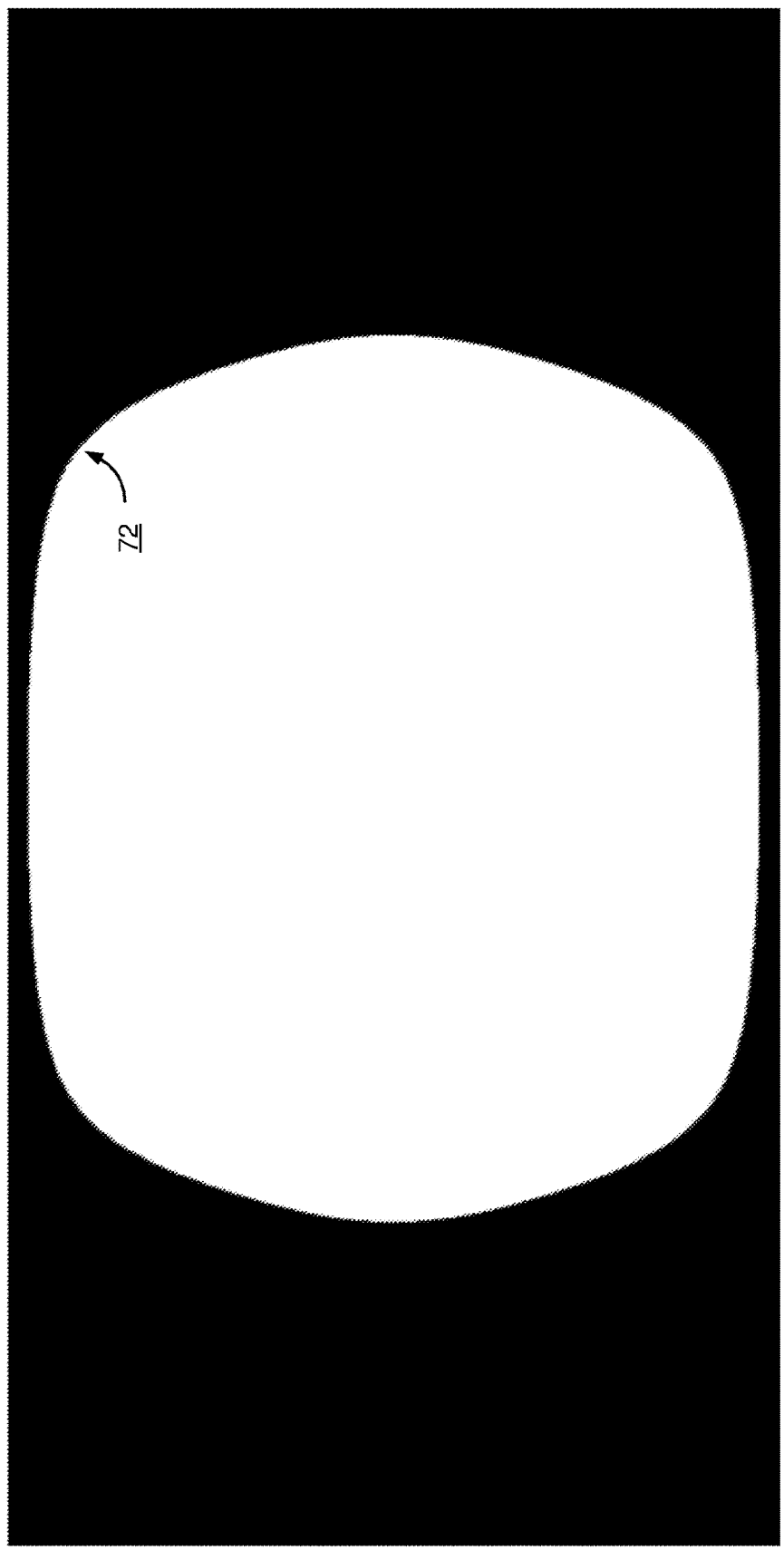
FIG. 7 illustrates an exemplary image representing a mask displaying a 200×180 degrees angle-of-view in a standard 360-degree container, as may be used by the system in accordance with one or more implementations.

By way of non-limiting example, FIG. 7 illustrates an exemplary image 70 representing a mask 72 displaying a 200×180 degrees angle-of-view in a standard container 71. Container 71 may be configured to contain 360-degree content in a 16:9 aspect ratio. The periphery of mask 72 represents the border of the viewable video sequence that is based on the extracted portion of the captured visual information.

Referring to FIG. 1, container storing component 116 may be configured to store information in electronic storage. For example, container storing component 116 may be configured to store one or more containers in electronic storage, including but not limited to one or more containers created by container creating component 114.

Decompression component 118 may be configured to decompress information, in particular compressed information. For example, decompression component 118 may be configured to decompress a compressed video sequence from a stored container, including but not limited to containers stored by container storing component 116. In some implementations, decompression component 118 may be configured to decompress a compressed video sequence from a stored container into a decompressed video sequence that has a format suitable for presentation in a virtual reality head-mounted device, such as head-mounted device 130. The format of the decompressed video sequence may be stereoscopic. In some implementations, the decompression performed by decompression component 118 may be configured to undo and/or counteract the compression performed by compression component 112. In some implementations, the amount of compression and decompression may be uniform across the width of the images. In some implementations, the amount of compression and decompression may not be uniform, and may be greater at the periphery than at the center of the images.

Presentation component 122 may be configured to present information to one or more users, including but not limited to visual information. In some implementations, information may be presented through a virtual reality head-mounted device, such as head-mounted device 130. In some implementations, information may be presented through projection in a dome, such as dome 131. Dome 131 may be configured to accommodate a particular horizontal angle-of-view and/or vertical angle-of-view. For example, dome 131 may be configured to accommodate one or more of a horizontal angle-of-view of at least 200 degrees, a vertical angle-of-view of at least 180 degrees, and a vertical angle-of-view having fewer degrees than the horizontal angle-of-view.

Presentation component 122 may be configured to present the decompressed video sequence to one or more users. In some implementations, presentation component 122 may be configured to present the decompressed video sequence through a virtual reality head-mounted device in accordance with the viewing direction of the user as the user is wearing the virtual reality head-mounted device. The presentation of the decompressed video sequence may have a horizontal angle-of-view of at least 200 degrees. The presentation may be performed such that a computer-generated virtual environment is presented through the virtual reality head-mounted device in addition to the decompressed video sequence.

Figure 8:
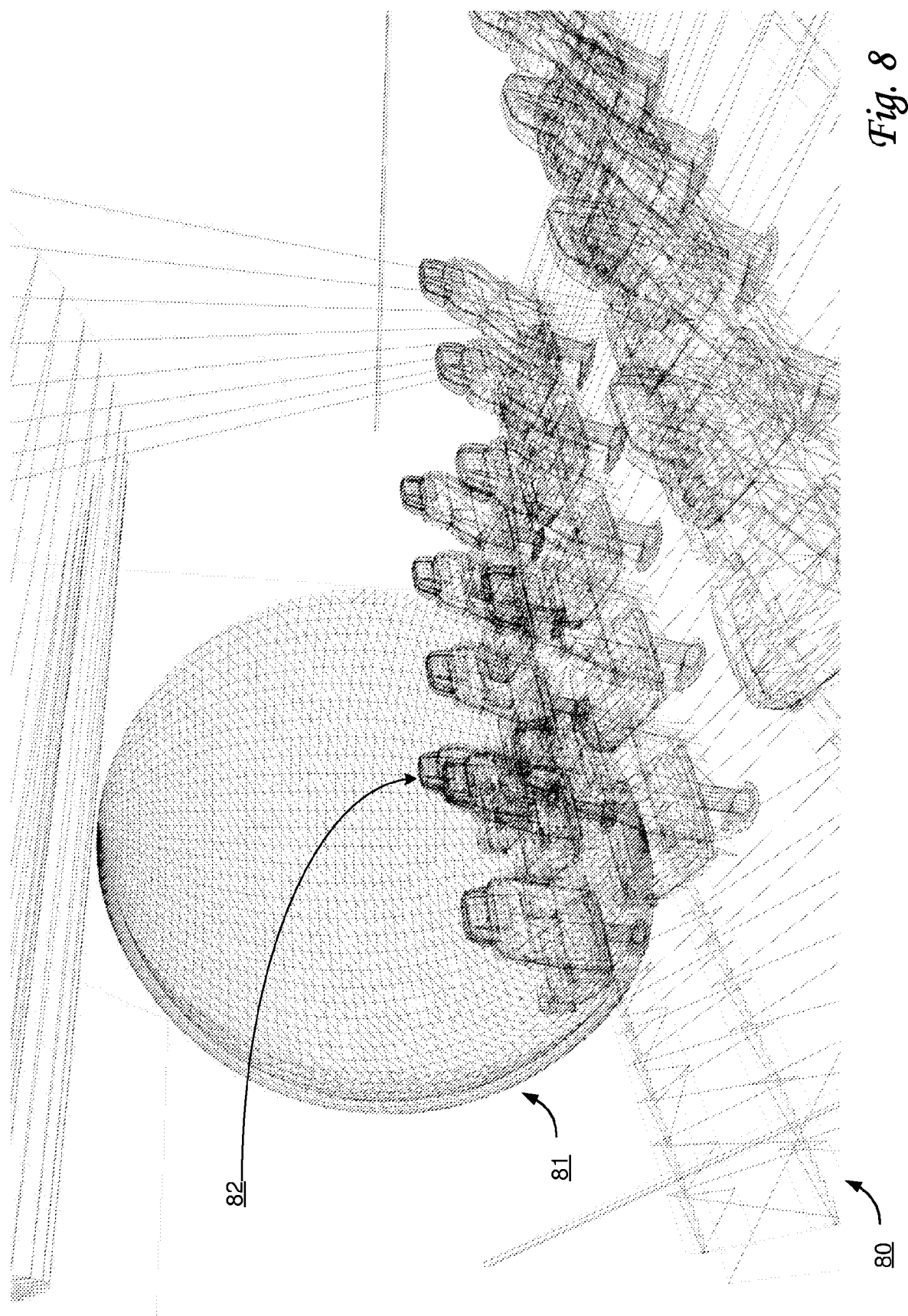

By way of non-limiting example, FIG. 8 illustrates an exemplary image 80 representing a view from the rear of an immersive virtual theatre environment including a dome 81 shaped for presentation of a video sequence, including but not limited to a video sequence decompressed by retrieved by decompression component 118. The horizontal and vertical angle-of-view from a viewer position 82 may be configured to provide an immersive experience to a user viewing from viewer position 82. The remaining elements in the immersive virtual theatre environment, such as additional chairs, may be merely for cosmetic purposes, and only visible to the user when the user turns around during presentation. By way of non-limiting example, FIG. 9 illustrates an exemplary image 90 representing a view from the side of an immersive virtual theatre environment including dome 81 shaped for presentation of a decompressed video sequence to a viewer viewing from viewer position 82. By way of non-limiting example, as depicted in FIG. 9, the vertical angle-of-view from viewer position 82 is 180 degrees, and the horizontal angle-of-view from viewer position 82 is clearly more than the vertical angle-of-view, and about 200 to 220 degrees in this example. By way of non-limiting example, FIG. 10 illustrates an exemplary image 91 representing a view from the from of an immersive virtual theatre environment including dome 81 shaped for presentation of a decompressed video sequence to a viewer viewing from viewer position 82. Again, the remaining elements in the immersive virtual theatre environment of FIG. 10, such as additional chairs, may be merely for cosmetic purposes, and only visible to the user when the user turns around during presentation.

Orientation determination component 120 may be configured to determine an orientation of the virtual reality head-mounted device, such as head-mounted device 130. The virtual reality head-mounted device may be worn by a user. The orientation may correspond to a viewing direction of the user. The presentation may be performed in accordance with the viewing direction of the user. For example, the visual information presented to the user while wearing the virtual reality head-mounted device may have a horizontal angle-of-view that is smaller than the available horizontal angle-of-view of the decompressed video sequence. As the user turns his head to the right, the presented visual information may effectively swivel and/or pan to the right within the available horizontal angle-of-view of the decompressed video sequence. As the user turns his head to the left, the presented visual information may effectively swivel and/or pan to the left within the available horizontal angle-of-view of the decompressed video sequence. Likewise, the visual information presented to the user while wearing the virtual reality head-mounted device may have a vertical angle-of-view that is smaller than the available vertical angle-of-view of the decompressed video sequence. As the user tilts his head up, the presented visual information may effectively tilt up within the available horizontal angle-of-view of the decompressed video sequence. As the user tilts his head down, the presented visual information may effectively tilt down within the available horizontal angle-of-view of the decompressed video sequence. Combinations of swiveling and/or panning and tilting are envisioned within the scope of this disclosure. In some implementations, certain head movements of the user may correspond to zooming in and/or out.

Figure 6:
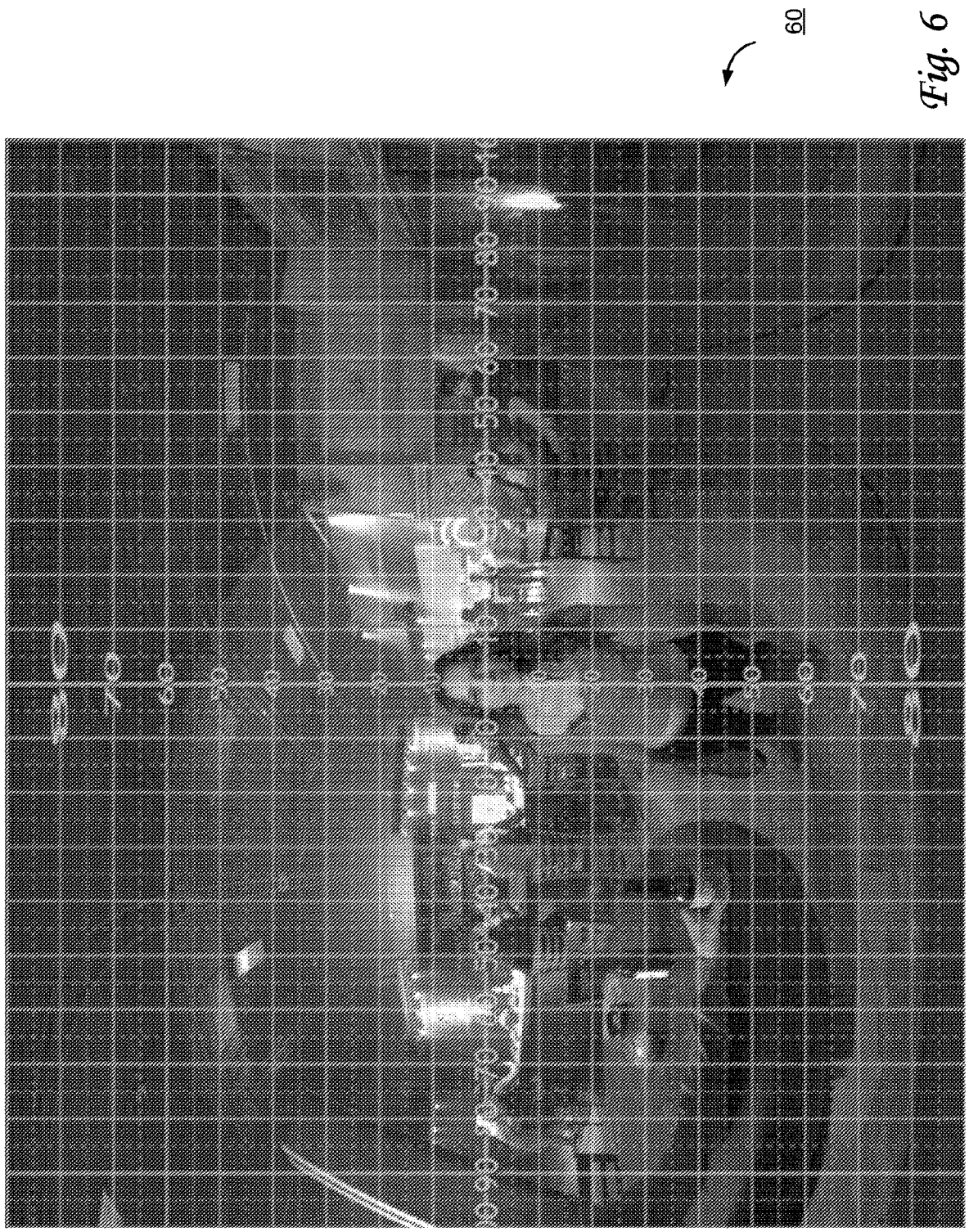
FIG. 6 illustrates an exemplary image representing an image in a viewable video sequence, as may be used by the system in accordance with one or more implementations.

By way of non-limiting example, FIG. 6 illustrates an exemplary image 60 representing a moment of a decompressed video sequence (with a superimposed grid). The decompressed video sequence may be based on captured visual information. By virtue of the operations performed as described in this disclosure (including but not limited to operations by information retrieval component 108, portion extraction component 110, compression component 112, container creating component 114, container storing component 116, decompression component 118, presentation component 122, and/or other components of system 100), image 60 may be part of a highly immersive experience via presentation through a virtual reality head-mounted device, with low levels of distortion. In particular the center of image 60 may have little to none of the barrel distortion common with fisheye lenses. Image 60 may have a horizontal angle-of-view of at least 200 degrees and no more than 250 degrees, a vertical angle-of-view of at least 180 degrees, and a horizontal angle-of-view having a greater number of degrees than the vertical angle-of-view.

Referring to FIG. 1, in some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, 116, 118, 120, and/or 122, and/or other components. Processor(s) 128 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 128 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 128 may be configured to execute one or more additional components that may perform some or all of the functionality attributed below to one of components 108, 110, 112, 114, 116, 118, 120, and/or 122.

Figure 2:
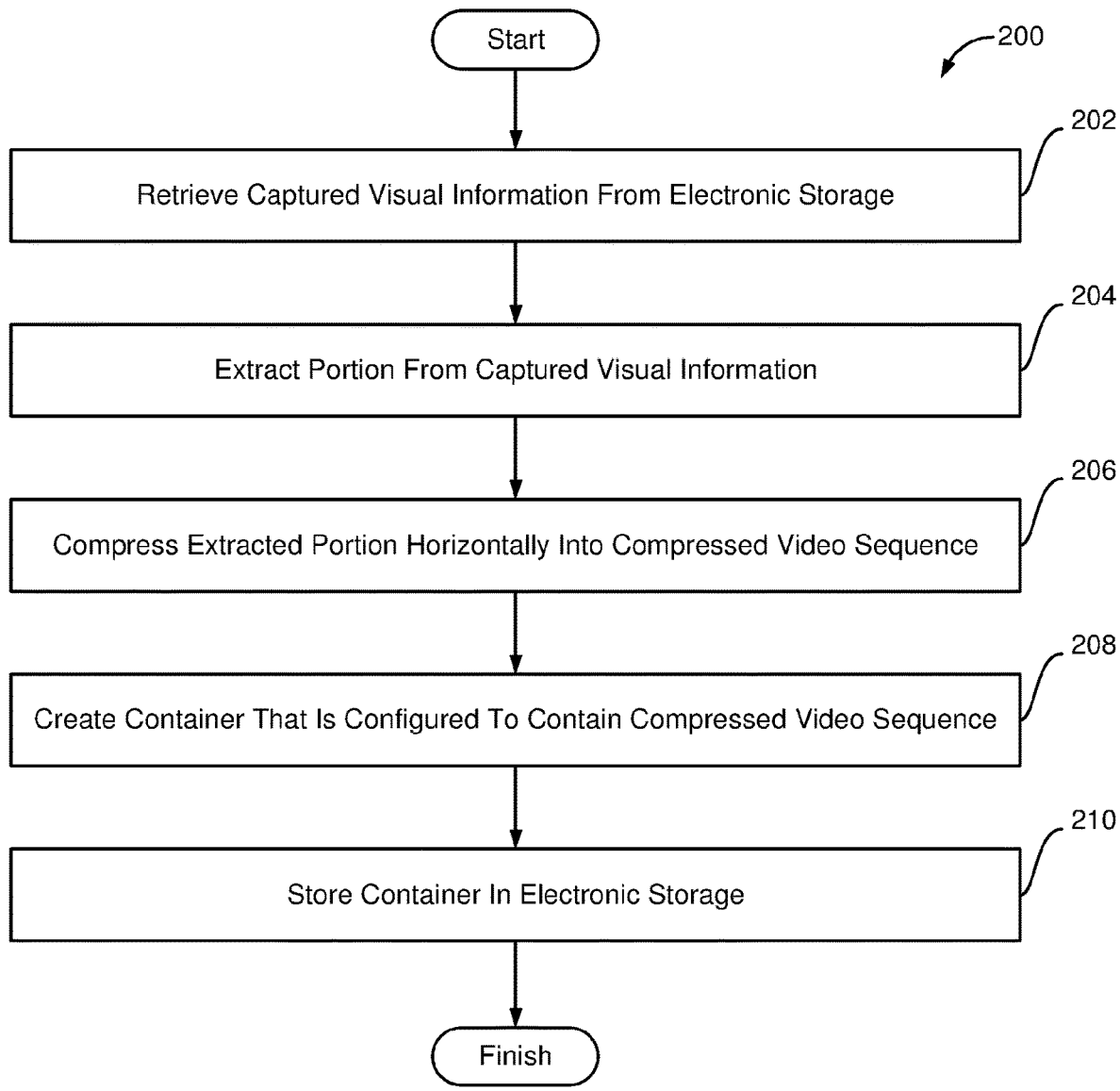
FIG. 2 includes a flow chart of a method for compressing and decompressing a sequence of images, in accordance with one or more implementations.

FIG. 2 illustrates a method 200 for compressing and decompressing a sequence of images and/or visual information, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include retrieving the captured visual information from electronic storage. Operation 202 may be performed by one or more hardware processors configured by machine-readable instructions including a component that is the same as or similar to information retrieval component 108, in accordance with one or more implementations.

) An operation 204 may include extracting a portion from the captured visual information. The extracted portion may have a horizontal angle-of-view of at least 200 degrees. The extracted portion may have a vertical angle-of-view of at least 180 degrees. The extracted portion may have the vertical angle-of-view of fewer degrees than the horizontal angle-of-view. Operation 204 may be performed by one or more hardware processors configured by machine-readable instructions including a component that is the same as or similar to portion extraction component 110, in accordance with one or more implementations.

An operation 206 may include compressing the extracted portion horizontally into a compressed video sequence. Operation 206 may be performed by one or more hardware processors configured by machine-readable instructions including a component that is the same as or similar to compression component 112, in accordance with one or more implementations.

An operation 208 may include creating a container that is configured to contain the compressed video sequence. Operation 208 may be performed by one or more hardware processors configured by machine-readable instructions including a component that is the same as or similar to container creating component 114, in accordance with one or more implementations.

An operation 210 may include storing the container in electronic storage. Operation 210 may be performed by one or more hardware processors configured by machine-readable instructions including a component that is the same as or similar to container storing component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for compressing and decompressing a sequence of images, the system comprising:
   one or more hardware processors configured by machine-readable instructions to:
   retrieve captured visual information from electronic storage;
   extract a portion from the captured visual information, wherein the extracted portion has a horizontal angle-of-view of at least 200 degrees, wherein the extracted portion has a vertical angle-of-view of at least 180 degrees, and wherein the vertical angle-of-view of the extracted portion has fewer degrees than the horizontal angle-of-view of the extracted portion;
   compress the extracted portion horizontally into a compressed video sequence;
   create a container that is configured to contain the compressed video sequence; and
   store the container in electronic storage.

2. The system of claim 1, wherein the one or more hardware processors are further configured by machine-readable instructions to:
   decompress the compressed video sequence from the stored container into a decompressed video sequence that has a format suitable for presentation in a virtual reality head-mounted device;
   determine an orientation of the virtual reality head-mounted device, wherein the virtual reality head-mounted device is worn by a user, wherein the orientation corresponds to a viewing direction of the user; and
   present the decompressed video sequence through the virtual reality head-mounted device in accordance with the viewing direction of the user, wherein the presentation of the decompressed video sequence has a horizontal angle-of-view of at least 200 degrees, wherein the presentation of the decompressed video sequence has a vertical angle-of-view of at least 180 degrees, and wherein the vertical angle-of-view of the presentation of the decompressed video sequence has fewer degrees than the horizontal angle-of-view of the presentation of the decompressed video sequence.

3. The system of claim 1, wherein the one or more hardware processors are further configured by machine-readable instructions to:
decompress the compressed video sequence from the stored container into a decompressed video sequence;
present the decompressed video sequence by projection in a dome, wherein the projection has a horizontal angle-of-view of at least 200 degrees, wherein the projection has a vertical angle-of-view of at least 180 degrees, and wherein the vertical angle-of-view of the projection has fewer degrees than the horizontal angle-of-view of the projection.

4. The system of claim 1, wherein compressing the extracted portion horizontally is performed such that a first sub-portion in the center of the captured visual information is compressed less than a second sub-portion at the periphery of the captured visual information.

5. The system of claim 2, wherein the presentation is performed such that a computer-generated virtual environment is presented through the virtual reality head-mounted device in addition to the decompressed video sequence.

6. The system of claim 1, wherein compressing the extracted portion horizontally into the compressed video sequence includes converting the extracted portion into a rectilinear projection that represents the captured visual information.

7. The system of claim 6, wherein converting the extracted portion into the rectilinear projection is performed such that vertical lines in captured real-world images correspond to vertical lines in the rectilinear projection.

8. The system of claim 1, wherein the compressed video sequence has a latitude-longitude format.

9. The system of claim 1, wherein the captured visual information has a resolution of at least 5184×4320 pixels.

10. The system of claim 1, wherein the compressed video sequence in the container has a format, and wherein the format is stereoscopic.

11. A method for compressing and decompressing a sequence of images, the method comprising:
retrieving captured visual information from electronic storage;
extracting a portion from the captured visual information, wherein the extracted portion has a horizontal angle-of-view of at least 200 degrees, wherein the extracted portion has a vertical angle-of-view of at least 180 degrees, wherein the vertical angle-of-view of the extracted portion has fewer degrees than the horizontal angle-of-view of the extracted portion;
compressing the extracted portion horizontally into a compressed video sequence;
creating a container that is configured to contain the compressed video sequence; and
storing the container in electronic storage.

12. The method of claim 11, further comprising:
decompressing the compressed video sequence from the stored container into a decompressed video sequence that has a format suitable for presentation in a virtual reality head-mounted device;
determining an orientation of the virtual reality head-mounted device, wherein the virtual reality head-mounted device is worn by a user, wherein the orientation corresponds to a viewing direction of the user; and
presenting the decompressed video sequence through the virtual reality head-mounted device in accordance with the viewing direction of the user, wherein the presentation of the decompressed video sequence has a horizontal angle-of-view of at least 200 degrees, wherein the presentation of the decompressed video sequence has a vertical angle-of-view of at least 180 degrees, and wherein the vertical angle-of-view of the presentation of the decompressed video sequence has fewer degrees than the horizontal angle-of-view of the presentation of the decompressed video sequence.

13. The method of claim 11, further comprising:
decompressing the compressed video sequence from the stored container into a decompressed video sequence; and
presenting the decompressed video sequence by projection in a dome, wherein the projection has a horizontal angle-of-view of at least 200 degrees, wherein the projection has a vertical angle-of-view of at least 180 degrees, and wherein the vertical angle-of-view of the projection has fewer degrees than the horizontal angle-of-view of the projection.

14. The method of claim 11, wherein compressing the extracted portion horizontally is performed such that a first sub-portion in the center of the captured visual information is compressed less than a second sub-portion at the periphery of the captured visual information.

15. The method of claim 12, wherein the presentation is performed such that a computer-generated virtual environment is presented through the virtual reality head-mounted device in addition to the decompressed video sequence.

16. The method of claim 11, wherein compressing the extracted portion horizontally into the compressed video sequence includes converting the extracted portion into a rectilinear projection that represents the captured visual information.

17. The method of claim 16, wherein converting the extracted portion into the rectilinear projection is performed such that vertical lines in captured real-world images correspond to vertical lines in the rectilinear projection.

18. The method of claim 11, wherein the compressed video sequence has a latitude-longitude format.

19. The method of claim 11, wherein the captured visual information has a resolution of at least 5184×4320 pixels.

20. The method of claim 11, wherein the compressed video sequence in the container has a format, wherein the format is stereoscopic.

* * * * *